Figure 1:
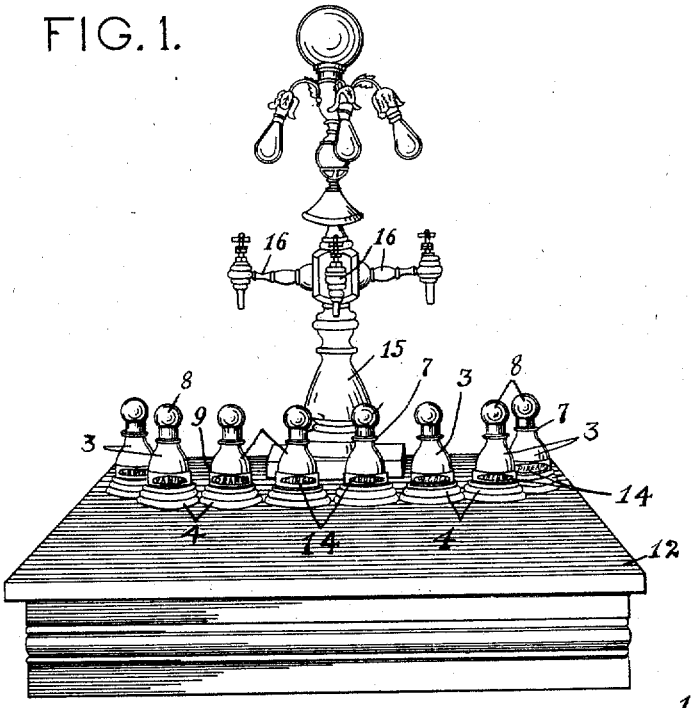

No. 12,477. REISSUED MAY 1, 1906.

F. H. HECKER.

SANITARY SYRUP RECEPTACLE FOR SODA WATER FOUNTAINS.

APPLICATION FILED MAY 22, 1905.

WITNESSES:

Fred. L. Koehler

Robt. Klotz

INVENTOR

Frederick H. Hecker

BY

J. Warner Dickerson

ATTORNEY

ANDREW B. GRAHAM CO., PHOTO-LITHOGRAPHERS, WASHINGTON, D. C.

UNITED STATES PATENT OFFICE.

FREDERICK H. HECKER, OF LOS ANGELES, CALIFORNIA

SANITARY SYRUP-RECEPTACLE FOR SODA-WATER FOUNTAINS.

No. 12,477. Specification of Reissued Letters Patent. Reissued May 1, 1906.

Original No. 746,832, dated December 15, 1903. Application for reissue filed May 22, 1905. Serial No. 261,718.

*To all whom it may concern:*

Be it known that I, FREDERICK H. HECKER, a citizen of the United States, residing at Los Angeles, in the county of Los Angeles and State of California, have invented certain new and useful Improvements in Sanitary Syrup-Receptacles for Soda-Water Fountains, of which the following is a specification.

This invention relates to soda-water fountains, and has particular reference to syrup receptacles or bottles and their arrangement upon a counter, table-top, or marble slab of a fountain.

The general objects of my invention are to provide a useful bottle jacket, girdle, or label-band which is removably mounted upon said bottle when the latter is in its position at the fountain, which when the bottle is in its place labels the bottle-body itself and protects it in substantially the same manner as a permanent bottle-jacket; to provide means for firmly supporting and conspicuously displaying syrup bottles or receptacles in and on the soda-water counter itself, and thereby dispense with the employment of special stands, show-cases, or display devices.

To attain the foregoing objects and other advantages, I provide the syrup-bottles with removable jackets, shields, or bands constructed to rest as flanges or rims around and above bottle-openings. I also preferably provide said jackets, shields, or bands with means for supporting the bottles or equivalent means for supporting the bottles upon said jackets when the latter are adjusted to their openings. I also provide suitably-arranged openings or perforations through the counter or table top of the fountain and bottle jackets or shields, the latter protecting the bottles above the counter-top. I also utilize these jackets, shields, or bands as vehicles for names or identifying characters designating, for instance, the quality or kind of syrup contained in each individual bottle, and in order that said names or characters shall appear substantially as being upon the bottles themselves when the latter are in position instead of merely identifying the places for the bottles I make said jackets, shields, or bands bell-shaped, so as to form apparently continuations of or portions of the bottles which they encircle. Any other jacket configuration which will blend, as it were, with any particular form of bottle-body will carry out the same idea, of course, as the bell-shaped form.

I am aware that sockets for glass syrup-receptacles have heretofore been constructed, but no soda-water-fountain table or counter top has been utilized in combination with a bottle jacket or guard to at once ornament a plain bottle, label, protect, and display it in its most natural and convenient position with relation to the spigot or faucets, and also mark the bottle's position when it is removed. All this my invention is designed to accomplish without taking up any more, if as much, room as each bottle would occupy standing upon the counter. Usually the syrup-bottles are held in separate cabinets or racks.

My invention consists in the combination, with a counter-top or table-top, of a soda-water fountain, having an opening therethrough for a bottle, of a bottle or syrup-receptacle provided with a jacket or the like, means for supporting said jacket against sliding movement on said counter-top, and means for supporting the bottle in said jacket and in a partly-exposed position.

The invention further consists in the combination, with a perforated counter-top, of a flange or rim which is arranged to extend above the surface of said counter-top and serve as a shield or guard around the opening through the counter-top and means for supporting a syrup-bottle within said rim and opening.

The invention further consists in the combination, with a counter-top having bottle-openings therethrough, of identifying and protecting rims or shields around said openings and means for supporting syrup-bottles in said openings.

My invention will be more readily understood by reference to the accompanying drawings, forming a part of this specification, and in which—

Figure 3:
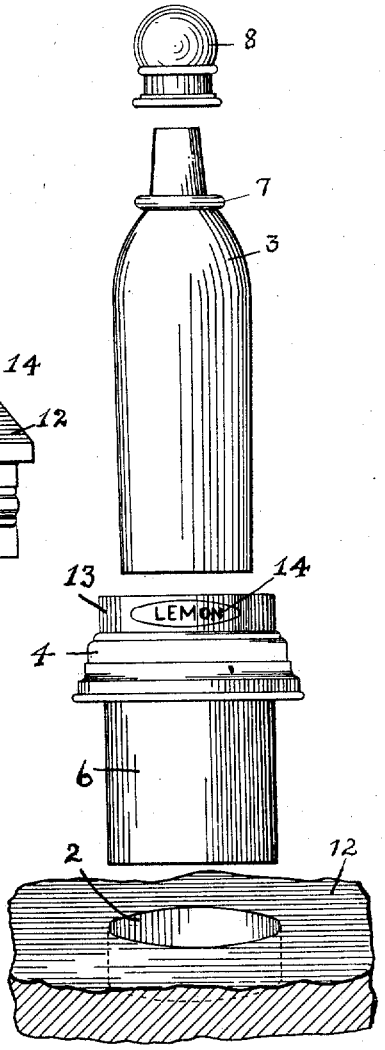
Figure 2:
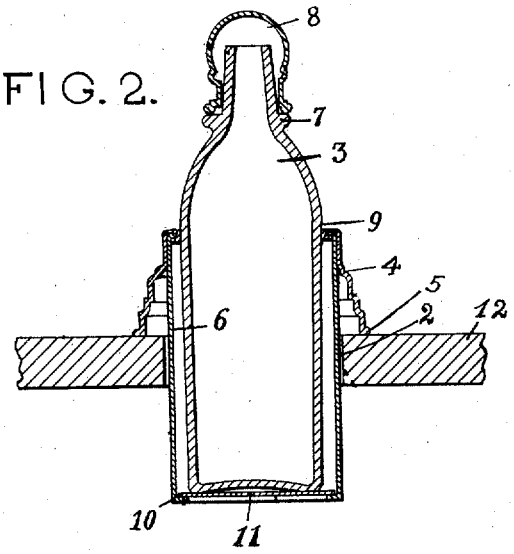

Figure 1 is a perspective view of a soda-water fountain with my invention applied thereto. Fig. 2 is an enlarged vertical section through one of the syrup-receptacles and the combination jacket, identifying-band and bottle-shield in position relatively to its counter-opening. Fig. 3 is an elevation of a syrup-receptacle guard or jacket, and fragment of perforated counter-top detached from each other.

In the drawings, 2 represents one of the series of holes cut through the counter-top of a soda-water fountain for a receptacle or bottle 3. The latter are usually made of glass and of uniform size. Around each hole 2 is a flange or rim 4. This flange or rim is held as a guard around the opening 2 by means of a shoulder portion 5 resting on the counter-top and a socket portion 6 engaging the walls of the aperture 2. As said flange 4 is also a bottle-jacket, it is constructed to conform to the contour of a bottle, preferably the upper or contracted portion of the body of the bottle, or bell shape, as shown. A bead or ridge 7 is shown on the neck of the bottle 3 for supporting the stopper 8. I prefer to extend the portion 6 downwardly, form an inwardly-turned flange 10 upon it, and place a bottom disk 11 upon said flange. Thus the part 6 takes the form of a socket-piece which not only supports the flange or jacket 4 relatively to its opening 2, but also supports the bottle. The means for supporting the parts 2, 3, and 4 relatively to each other, as shown in Fig. 1, may, however, be varied in a great number of ways, and I do not confine myself to any specific details of construction for maintaining their normal relative positions. The essential features of the invention are that the guard 4 is supported, so as to shield the bottle for which it serves as a jacket from being struck and broken by other objects pushed about on the counter, that said guard clothes or enhances the appearance of the bottle when the latter is in its place, &c., as previously pointed out. The jacket or flange 4 may be made of any suitable ornamental metal or other material which will not break like glass and in any ornamental design and offers a large variety of opportunities to give very plain bottles the appearance of the most expensive kinds, and when a plain or cheap bottle is broken the jacket or flange 4 serves to clothe another plain bottle with a dress of higher quality. The jacket 4 may be made in the form of filigree or open work for that purpose or any fanciful design which does not destroy its usefulness for other than strictly ornamental purposes. The top of the flange, guard, or jacket 4 is preferably in the form of a plain band or collar 13, upon which is a name 14, either engraved in said band or placed thereupon in any suitable manner.

As shown in Fig. 1, I preferably arrange the openings 2 in an arc around the spigot, column, or stand 15, having faucets 16. The receptacles or bottles are thus placed in the most accessible position for service on the service-slab or counter-top and a separate holder or cabinet is dispensed with. The latter have usually been required heretofore, because no provision has been made for supporting bottles in systematic and secure order upon a counter, so that they would not be accidentally broken by other objects on the counter being pushed against them or the bottles themselves tipped over.

I am aware that ice-boxes have been made with inwardly-projecting tubes for supporting bottles to be cooled, the chief idea in which inventions have been a closed tube exposed to the cooling influence of ice and yet completely closed against ice obstructing the tube; but whether or not the tube is open or closed in my invention is immaterial unless the cooling feature is added thereto. In fact, the tube is ordinarily immaterial, as it can be dispensed with entirely and any other means of support attached to the jacket 4 or independent thereof may be provided for sustaining the bottles 3 in their position relatively to the jackets and table-top. In the aforementioned ice-box tubes no provision has been made, so far as I am aware, for carrying out the idea of a bottle-girdle inscribed with or carrying identifying characters and at the same time serving in the numerous other capacities explained in the foregoing description, including, for instance, an expensive cloak for a cheap bottle, to use a figurative expression. Furthermore, where the mere tube idea has obtained in prior inventions employing that portion of my invention or detail thereof having to do with the socketing of bottles such tubes have generally been rigidly-fixed parts of the ice-box and not provided with means for supporting them removably, so that they could be conveniently cleaned and the table-top or ice-box top cleared of obstruction for the same purpose.

Having thus described my invention, I claim as new and desire to secure by Letters Patent—

1. The combination with a flat counter-top having a perforation or opening therethrough for a syrup-receptacle, of a jacket arranged to project above said perforation or opening and to rest upon said counter-top in such a manner that it serves to protect the upper portion of the body of the receptacle without interfering with the display of the top thereof, and means for supporting said receptacle in said opening.

2. The combination, with a counter-top having bottle-holes therein, of bottle-jackets removably supported above said holes, and means for supporting syrup receptacles or bottles in said holes in such a manner that said jackets form protecting-girdles for the portions of said bottles that project above the surface of the counter-top, said jackets being constructed to conform substantially to the contour of the upper portions of the bottle-bodies.

3. The combination, with a counter-top having an opening therein, of a bottle-support, a bell-shaped collar adapted to jacket a substantial portion of a bottle-body below its neck, said collar arranged to rest upon said counter and to support said bottle-support in said opening.

4. The combination, of the counter-shelf of a soda-water-dispensing apparatus provided with holes, with removable bottle-supports in said holes provided with bell-shaped collars; said supports extending above and below the top of said counter-shelf, and incasing an upper portion of the bottle; said bell-shaped collars secured to said supports and supporting the same in suspended position.

In testimony whereof I have hereunto set my hand in the presence of two subscribing witnesses.

FREDERICK H. HECKER.

Witnesses:
JOHN N. METCALF,
S. G. WATKINS.